US005788946A

United States Patent [19]
Riddle et al.

[11] Patent Number: 5,788,946
[45] Date of Patent: Aug. 4, 1998

[54] PURIFICATION OF HYDROXYLAMINE

[75] Inventors: Floyd Riddle, Emmaus; Frank Michelotti, Easton, both of Pa.

[73] Assignee: Ashland Inc., Dublin, Ohio

[21] Appl. No.: 895,361

[22] Filed: Jul. 16, 1997

[51] Int. Cl.⁶ .................................................. C01B 21/20
[52] U.S. Cl. ............................................. 423/387; 210/685
[58] Field of Search ............................ 423/387; 210/685

[56] References Cited

U.S. PATENT DOCUMENTS

| 4,147,623 | 4/1979 | Koff et al. |
| 4,166,842 | 9/1979 | Tunick et al. |
| 4,202,765 | 5/1980 | Koff et al. |
| 4,725,360 | 2/1988 | Fuchs et al. ............................ 423/387 |
| 5,318,762 | 6/1994 | Cawlfield et al. ...................... 423/387 |

FOREIGN PATENT DOCUMENTS

| 14640 | 4/1974 | Japan ..................................... 423/387 |

*Primary Examiner*—Wayne Langel
*Attorney, Agent, or Firm*—John Lezdey

[57] ABSTRACT

The invention provides a method for purification of hydroxylamine so as to have a substantial reduction of cations and anions. The method involves passing a solution of hydroxylamine through at least one strong acid ion exchange bed which has been pretreated with dilute hydrochloric acid and then through at least one strong base anion exchange resin bed.

10 Claims, No Drawings

PURIFICATION OF HYDROXYLAMINE

FIELD OF THE INVENTION

The present invention relates to a method for the purification of hydroxylamine. More particularly, there is provided a method of purifying aqueous solutions of hydroxylamine by means of ion exchange.

BACKGROUND OF THE INVENTION

Hydroxylamine has found many uses in a variety of industries. In the pharmaceutical industry and in connection with stripping compositions for photoresists it has found wide use. In both the pharmaceutical industry and for photoresist treatment it is important that the product is free of cation and anion impurities.

U.S. Pat. No. 4,147,623 of Koff et al., which is herein incorporated by reference, discloses the purification of hydroxylamine by ion exclusion which includes use of anion exchange resin in which hydroxylammonium salts are passed. The ion exchange resin is primarily utilized as a reaction source rather than for separation.

U.S. Pat. No. 4,202,765 to Koff et al., which is herein incorporated by reference, discloses the separation of hydroxylamine from a solution of hydroxylammonium salt through the use of a cation exchange resin. The process does not teach the exclusion of anions.

U.S. Pat. No. 5,318,762 to Cawlfield et al. discloses treating solutions of hydroxylammonium salts containing excess acid by passing the solutions through a weak base ion exchange resin.

U.S. Pat. No. 4,166,842 discloses a process of extracting hydroxylammonium ions from a solution utilizing a cation exchange resin which included the further step of converting the hydroxylammium ions to hydroxylamine.

None of the prior art teach the removal of cations and anions from hydroxylamine so as to produce a highly purified hydroxylamine.

SUMMARY OF THE INVENTION

The present invention provides a method for the purification of hydroxylamine so that cations and anions which are normally present are greatly reduced. The process contains the steps which comprise:

A. Passing an aqueous solution of hydroxylamine through at least one macroporous or gel, strong acid cation exchange resin bed which has been previously treated or regenerated with a dilute hydrochloric acid solution to convert all acid groups to the hydrogen form and then B. Passing the solution from Step A through a strong base anion exchange resin bed that has been treated or regenerated with a dilute sodium hydroxide or potassium hydroxide solution to convert all basic groups to the hydroxyl form.

Preferably, the hydrochloric acid solution is about 5 to 20% by weight hydrochloric acid.

Advantageously, there is utilized a plurality of cation exchange resin beds and a plurality of anion exchange resin beds are to provide the necessary volume of resins for high purity and infrequent regeneration.

It is therefore an object of the invention to provide hydroxylamine solutions which are substantially free of undesirable cations and anions.

It is another object of the invention to provide a process for purifying hydroxylamine through the use of anion and cation exchange resins.

DESCRIPTION OF THE PREFERRED EMBODIMENTS

According to the present invention, there is provided the purification of hydroxylamine whereby the resulting product is substantially free of undesirable cations and anions. The invention provides a process whereby an aqueous solution of hydroxylamine is passed through at least one bed of a strong acid cation exchange resin and at least one bed of a strong base anion exchange resin. It is essential in the invention that the cation exchange resin be pretreated with a dilute solution of hydrochloric acid so that all acid groups are in the H-form and to ensure that all metallic cations that may be present are extracted from the resin bed. The hydrochloric acid treatment is with a 5–20% hydrochloric acid solution, preferably, about 5–10% hydrochloric acid solution.

The strong base anion exchange resin is preferably pretreated or regenerated with either a dilute potassium hydroxide or sodium hydroxide solution so as to remove any undesirable anions which may be present on the resin which may contaminate the hydroxylamine. Also, this ensures that the basic groups of the resin are in the OH-form.

Using conventional methods of pretreatment such as with dilute sulfuric acid does not produce the same results as found when dilute hydrochloric acid has been used to pretreat or regenerate the cation exchange resin. In accordance with the invention, it is preferred to also pretreat the cation exchange resin with a dilute solution of hydroxylamine, such as a 5–20% aqueous solution, preferably, about 5–10% by weight solution of hydroxylamine before passing a 50% by weight solution of hydroxylamine through one or more beds of the cation exchange resins. An exothermic reaction is present when the hydroxylamine solution is first added to the cation exchange bed so that it is preferable to utilize a dilute hydroxylamine solution to condition the cation exchange resin by forming the hydroxylamine salt with the strong acid groups. The 50% aqueous hydroxylamine solution if initially utilized generates a highly exothermic reaction with the cation exchange resin in producing the corresponding amine salt that is capable of affecting the resin bed. The exothermic reaction can also be controlled by a controlled rate of introduction of the hydroxylamine solution. Once the amine salt has been formed and the isotherm subsides, the $Na^+$, $K^+$ and other cations in the 50% hydroxylamine solution exchange in the resin bed satisfactorily.

Most commercial ion exchange resins, both anionic and cationic, require an initial cleaning or regeneration prior to use. If the cleaning or regeneration is not performed, excessive decomposition of hydroxylamine may take place. In the situation where the $Na^+/K^+$ values in the hydroxylamine are reduced but the $Ca^{+2}$ values increase, there is an indication that the resin is high in $Ca^{+2}$ ions initially and they are being removed by the hydroxylamine. This means that additional cleaning or regeneration of the resin is required.

Both gel type and macroporous type of ion exchange resins can be used in the present process. Preferred are the polystyrene and polyacrylic acid strong acid hydrogen form cationic exchangers and the strong base anion exchangers of the polystyrene or polyacrylic type and $OH^-$ form. Most preferred are the sulfonated polydivinylbenzene/styrene cationic resins and the tetramethylammonium hydroxide modified poly (divinylbenzene/styrene copolymers as the anion exchange resins.

The weak acid type cation exchangers and the weak base anion exchangers either alone or in combination have been found less effective in reducing both the cation and anion impurities found in the hydroxylamine solutions which are commercially produced.

The anion exchange resins which may be utilized in the present invention include the Purolite anion exchange resins A-600, A-400, A-300, A-300E, A-400, A-850 and A-87, Rohm & Haas resins IRA-400, IRA-402, IRA-904 and IRA-93, Dow resins SBR, SAR, Dowex 66 and Dowex II, Ionac ASB-1, Duolite A-109 and the like in the OH⁻ form.

The cation exchange resins which may be utilized in the invention include Purolite resins CT-151, C-100, C-150, C-105 and NRW-100, Rohm & Haas resins IR-120, IR-122, 200, DP-1 and IRC-50, Dow resin MSC-1, Dowex 88 and CCR-2, Ionac resin CC and CNN, Duolite resin C-200, C-26, C-280 and the like in the H⁺ form.

The following examples are provided to further illustrate the present invention and are not intended to limit the scope of the present invention.

EXAMPLE 1

1. Into a 1 inch diameter glass column containing a stopcock was added 25ml of Purolite CT-151 cation exchange resin. The column was flushed with 1 liter of DI water. The resin was then flushed with 1000 ml of 10% hydrochloric acid. The column was tested by inductively coupled plasma (ICP) analysis to determine if all undesirable cations are removed. The column was then flushed with DI water until the chloride ion level was <0.5 ppm.

A 5% hydroxylamine solution was poured through the column to convert the acid groups to the amino salt and there was a mild exothermic reaction. After the isotherm was complete, a 50% hydroxylamine solution was passed through the column.

2. A glass column was prepared with Purolite anion exchange resin A-400 similar to Part I. 1000 ml of 8% KOH were passed through the column until an inductively coupled plasma analysis indicated removal of all metal anions, such $FeCl_6^{-3}$ or the like. The column was then flushed with 2 liters of DI water until the $K^+$ analysis by ICP was <5ppb. The 50% hydroxylamine solution processed in Step 1 was then passed through the anion exchange resin.

Preferably, the 50% hydroxylamine solution is passed through a sufficient number (about 5) of the prepared cation exchange beds and anion exchange beds (about 3) so that the required quality of the hydroxylamine solution can be obtained without frequent regeneration. These last two parameters are controlled by the volume in cubic feet of the resin used.

The reduction of trace metals by use of the process of Example 1 is summarized as follows:

|    | Before ion exchanged (ppb) | After cation-anion exchanged (ppb) |
|----|------|------|
| Al | 536  | <5 |
| Ca | 72   | <5 |
| Cr | 70   | <5 |
| Fe | 313  | <5 |
| Mg | 15   | <5 |
| Ni | 29   | 9  |
| K  | 307  | <5 |
| Si | 1687 | <5 |
| Na | 183  | <5 |

Similar results were obtained utilizing Purolite C-100 a gel strong acid poly(divinylbenzene/polystyrene) type cation resin or Purolite A-500 anion resin.

Comparative Example 1

The procedure of Example 1 was followed except that in lieu of 10% HCl, there was used 10% $H_2SO_4$ in Step 1 to condition the resin.

The resulting hydroxylamine after passage through the cation exchange resin contained an unacceptable amount of trace cations.

Comparative Example 2

The procedure of Example 1 was followed except that Purolite C-106 a polyacrylic type weak acid cation anion exchange macroporous resin was utilized.

The resulting hydroxylamine after passage through the anion exchange resin contained an unacceptable amount of trace cations.

Comdparative Example 3

The procedure of Example 2 was followed except that Purolite A-100 a weak base polystyrene type macroporous anion resin having tertiary amine functionality was used.

The resulting hydroxylamine after passage through the anion exchange resin contained an unacceptable amount of trace anions.

Comparative Example 4

The procedure of Example 1 was followed except that there was only utilized as the resin beds Purolite S-950 a chelating type resin having amenophosphonic functional groups.

The resulting hydroxylamine solution after passage through the chelating resin was unsatisfactory in trace metal ion removal.

What is claimed is:

1. A method for the purification of hydroxylamine which comprises the steps of:

A. passing an aqueous solution of hydroxylamine through at least one macroporous or gel strong acid cation exchange resin bed which has been treated with a dilute solution of hydrochloric acid to convert all acid groups to the hydrogen form, and then B. passing the solution from Step A through at least one strong base anion exchange resin bed that is in the hydroxyl form.

2. The method of claim 1 wherein about 5 to 20% hydrochloric acid solution is used in Step A in treating the resin.

3. The method of claim 1 wherein a dilute sodium hydroxide or potassium hydroxide solution is utilized in pretreating the resin of Step B.

4. The method of claim 1 wherein said resin of Step A is a strong acid polystyrene resin.

5. The method of claim 1 wherein said resin of Step B is a strong base polystyrene resin cross-linked with divinylbenzene.

6. The method of claim 1 wherein said hydroxylamine solution comprises about 5 to 20% by weight of hydroxylamine.

7. The method of claim 6 including the subsequent step of passing an about 50% by weight hydroxylamine solution through said resins.

8. The method of claim 1 wherein said hydroxylamine solution is passed through a multiple of resin beds in Step A.

9. The method of claim 1 wherein said hydroxylamine solution from Step A is passed through a multiple of resin beds in Step B.

10. A method for the purification of hydroxylamine which comprises the steps of:

a) forming a multiplicity of strong acid ion exchange beds;

b) forming a multiplicity of strong base ion exchange beds;

c) treating the strong acid ion exchange beds with a dilute hydrochloric acid solution;

d) treating the strong base ion exchange beds with a solution of sodium hydroxide or potassium hydroxide;

e) passing an aqueous solution containing about 5 to 20% by weight of hydroxylamine through said strong acid ion exchange beds from step c); and then f) passing an aqueous solution containing about 50% by weight of hydroxylamine through said strong acid ion exchange beds from step e) and then through said strong base ion exchange beds from step d).

* * * * *